United States Patent [19]
Lillelund et al.

[11] Patent Number: 5,560,316
[45] Date of Patent: Oct. 1, 1996

[54] PET FEEDING STATION

[75] Inventors: Stig Lillelund, Gentofte; Mikael Koch, Copenhagen, both of Denmark

[73] Assignee: Dart Industries Inc., Deerfield, Ill.

[21] Appl. No.: 402,289

[22] Filed: Mar. 16, 1995

[51] Int. Cl.⁶ ................................. A01K 5/01
[52] U.S. Cl. ........................... 119/61; 206/564
[58] Field of Search ............... 119/51.5, 61; 206/486, 206/487, 490, 562, 564, 565; 220/571.1

[56] References Cited

U.S. PATENT DOCUMENTS

| | | |
|---|---|---|
| D. 334,251 | 3/1993 | Tiu . |
| D. 351,689 | 10/1994 | VanSkiver . |
| 1,191,184 | 7/1916 | Hooper . |
| 2,029,342 | 4/1934 | Schultz . |
| 2,795,121 | 8/1954 | Pantello . |
| 3,085,718 | 4/1963 | Nelson . |
| 3,442,435 | 7/1967 | Ludder et al. . |
| 3,730,141 | 5/1973 | Manning et al. . |
| 4,034,715 | 7/1977 | Arner . |
| 4,044,723 | 8/1977 | Fitzpatrick ............................. 119/61 |
| 4,111,305 | 9/1978 | Thomas ............................. 206/564 X |
| 4,128,080 | 12/1978 | Haney . |
| 4,270,490 | 6/1981 | Kopp ................................. 119/61 |
| 4,315,483 | 2/1982 | Scheidler . |
| 4,348,988 | 9/1982 | Lawson . |
| 4,840,143 | 6/1989 | Simon . |
| 4,927,024 | 5/1990 | Lloyd ............................... 206/562 |
| 4,966,297 | 10/1990 | Doty ............................. 206/564 X |
| 5,011,018 | 4/1991 | Keffeler . |
| 5,105,768 | 4/1992 | Johnson ............................. 119/61 |
| 5,111,951 | 5/1992 | Breen et al. . |
| 5,234,125 | 8/1993 | Roberts ........................... 206/562 X |
| 5,263,437 | 11/1993 | Murphrey . |

OTHER PUBLICATIONS

J–B Catalog, 1993—The cover page and p. 14.

Primary Examiner—Robert P. Swiatek
Assistant Examiner—Yvonne R. Abbott
Attorney, Agent, or Firm—John A. Doninger

[57] ABSTRACT

A pet feeding station including an enlarged floor tray having a mounting wall which selectively mounts feeding containers in selected predetermined spacings on the tray by individual retainers on each container selectively engaged with a series of retainer-receiving recesses on the tray wall.

18 Claims, 3 Drawing Sheets

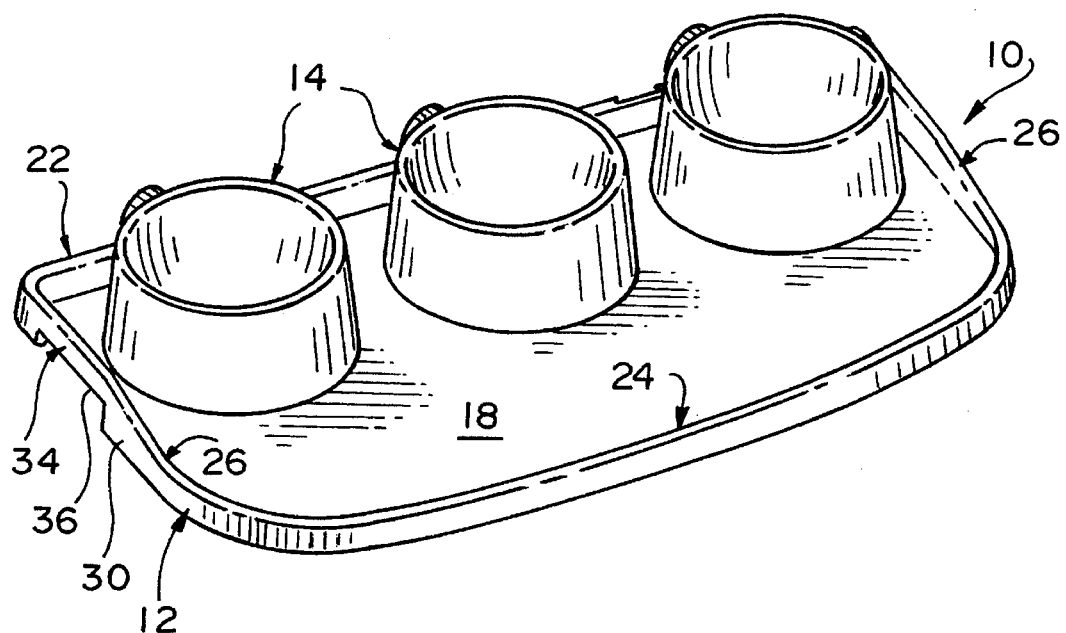
FIG_1
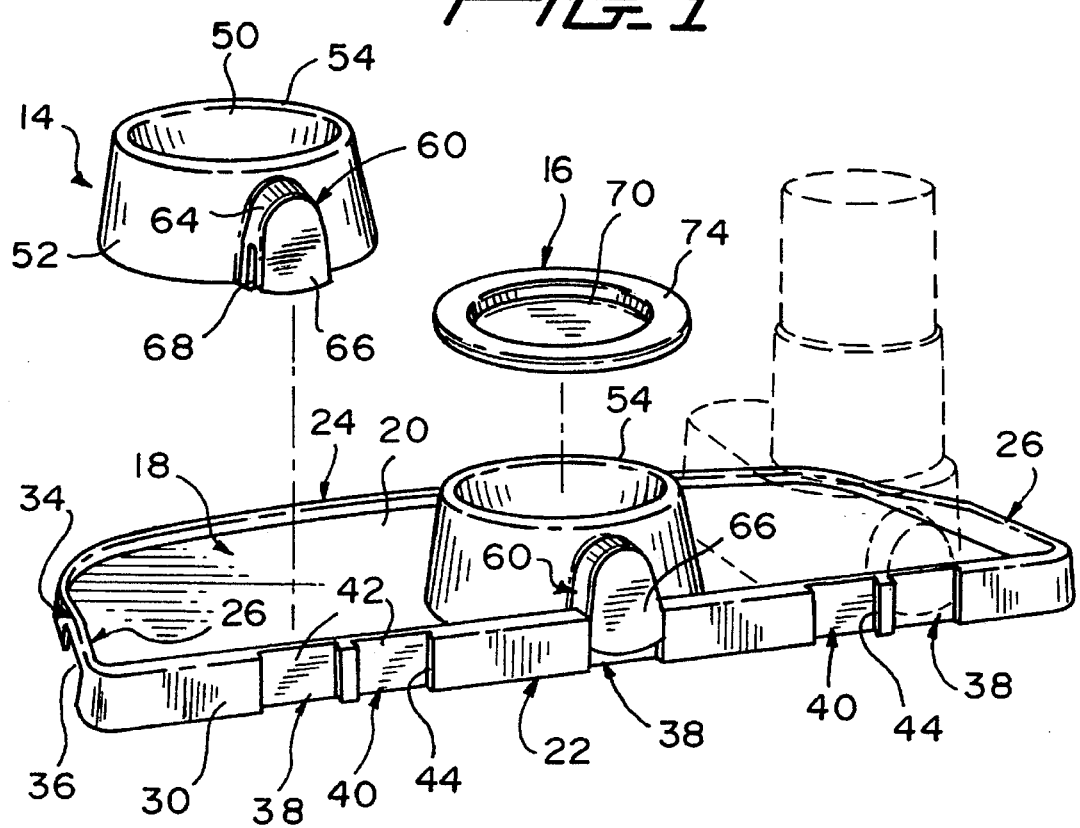
FIG_2

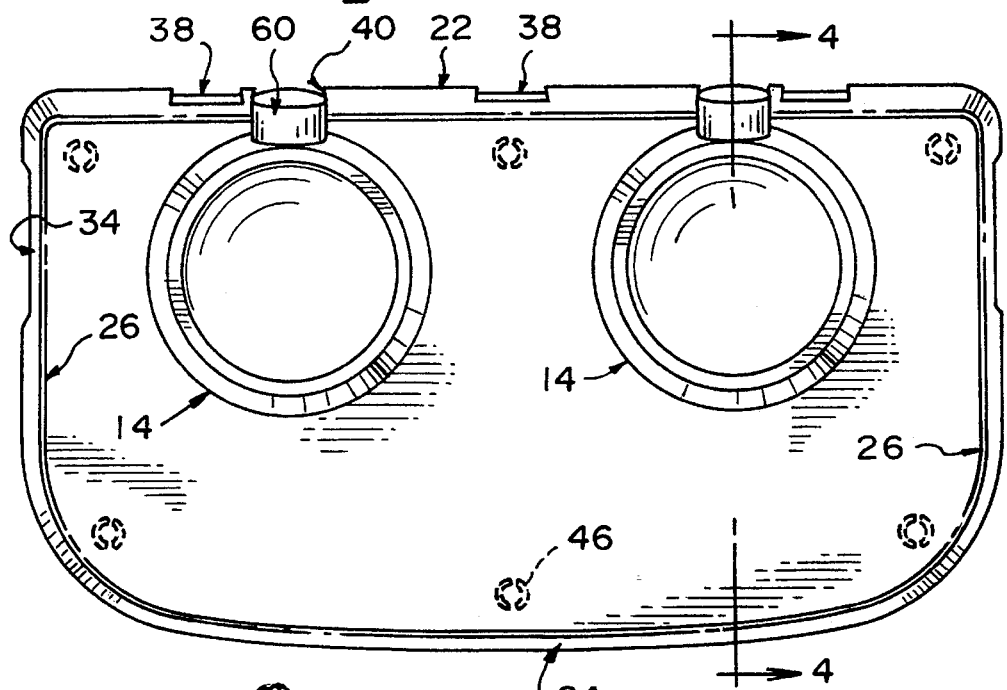
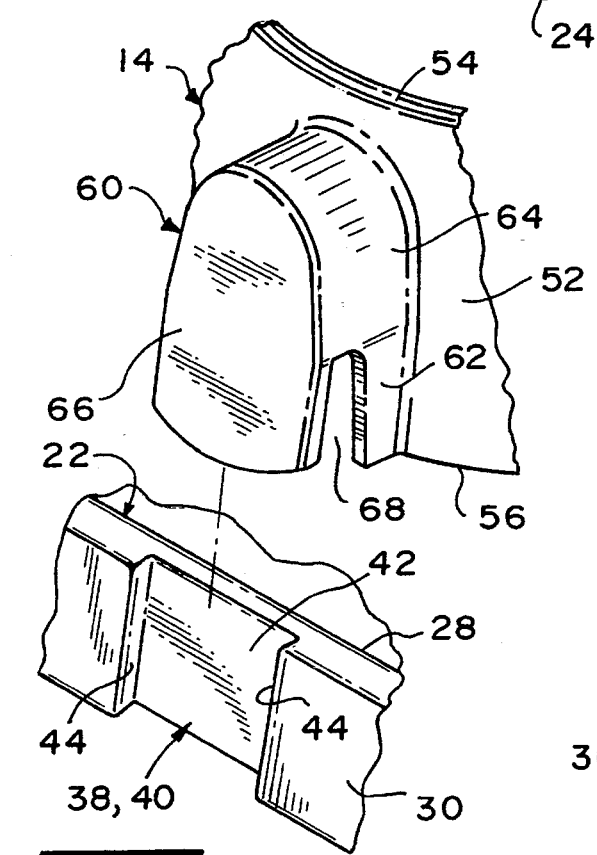
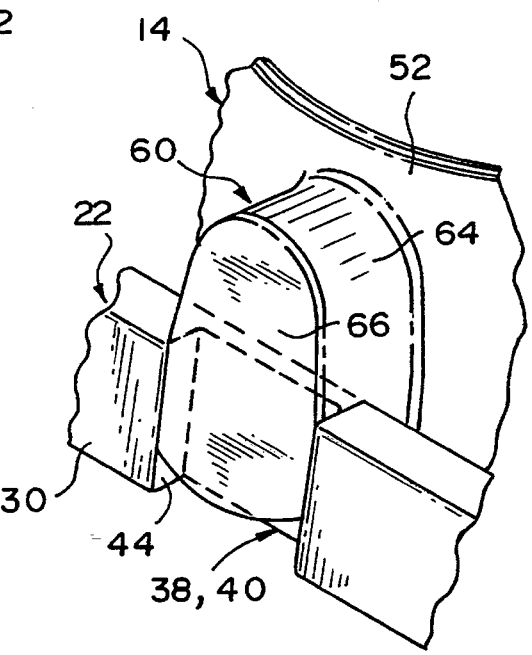

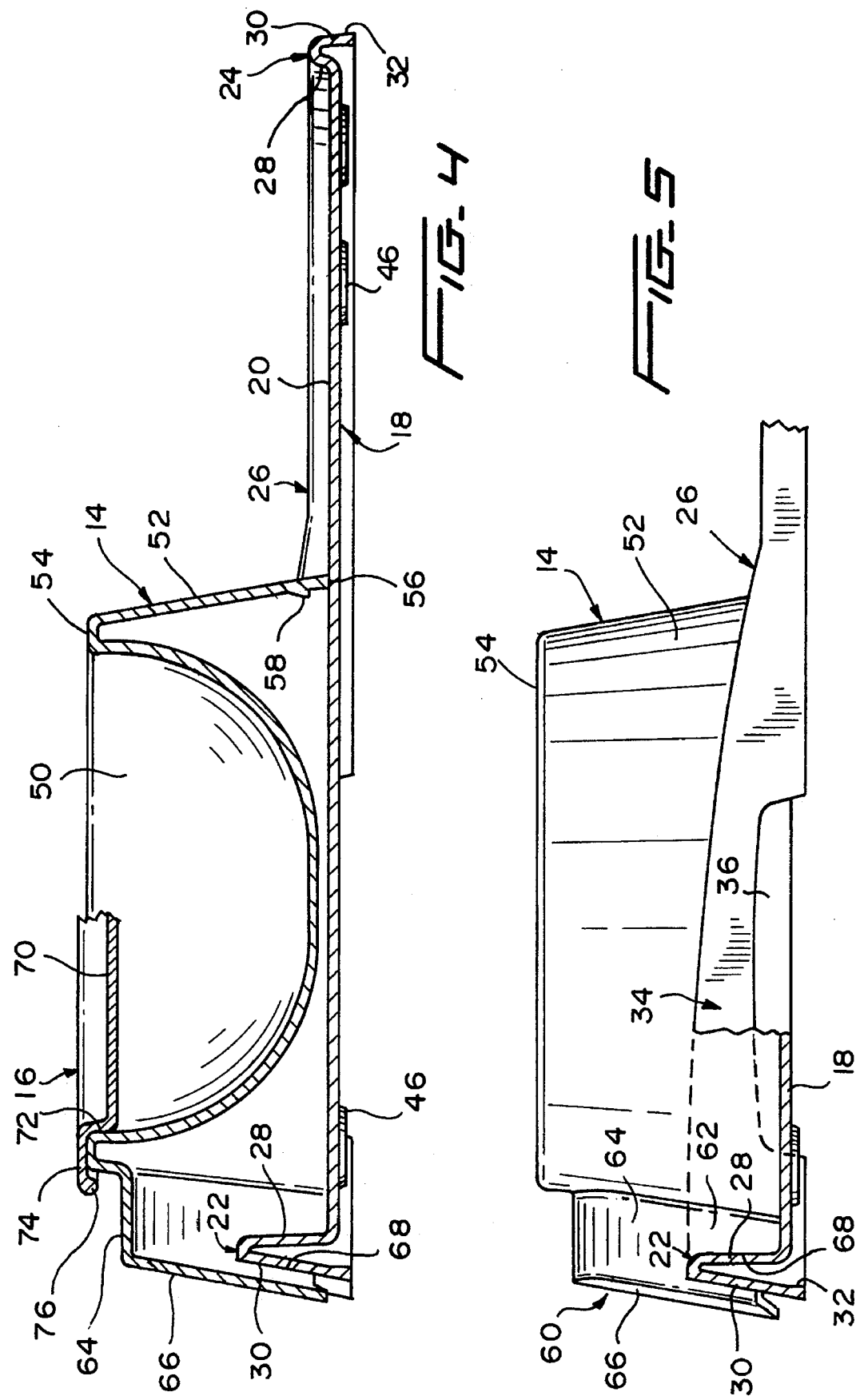

PET FEEDING STATION

BACKGROUND OF THE INVENTION

House pets, particularly cats and dogs, require proper and timely feeding. This is normally accomplished by putting out separate or partitioned bowls for food and water at specific times and with the foreknowledge that the area about the bowls will have to be cleaned of residue after the pet has completed feeding. This is particularly the case with cats which tend to remove food from the bowl to the floor prior to eating.

Each meal is normally prepared at the time of feeding, whether this involves merely pouring prepackaged foodstuff within the appropriate bowls or actually mixing a variety of ingredients. This task can at times be burdensome, particularly when coupled with the necessity to maintain the area about the feeding bowls clean as in the case of the bowls being placed on a kitchen floor. Problems can also arise when the pet owner or owners work or have other obligations out of the home, allowing little time to accommodate feeding schedules and the requisite cleanup involved.

SUMMARY OF THE INVENTION

The feeding station comprising the invention is intended to simplify many aspects of pet feeding. Toward this end, the feeding station includes an enlarged tray with raised peripheral walls including a linear rear wall with retainer components, preferably recesses, defined therein for the releasably locked reception of mating retainers on feeding containers.

Such feeding containers can comprise automated food and water dispensers and/or feeding bowls herein described in detail as being particularly adapted for use in conjunction with the tray in achieving the desired efficiency and cleanliness which is the significant object of the invention.

The feeding bowl itself is of a softly rounded configuration for ease of cleaning with the retainer extending therefrom for use as a handle in addition to the means whereby the bowl is fixed to the tray. The bowl is specifically provided with a lid or seal which is so configured as to not require any lip, groove, or the like on the bowl as would disrupt the smooth surface thereof which facilitates both feeding and cleaning. The provision of a seal is desirable in enabling the advance preparation of several bowls with the foodstuffs therein capable of being stored in a refrigerator or freezer in an odor free manner and with the freshness maintained for subsequent use without requiring preparation at the actual time of use.

The tray is of a size to accommodate normal spillage and otherwise maintain the floor free of debris due to the eating habits of the pet. For example, it is recognized that cats will normally pull out bits of food from a bowl for eating on the floor. The tray, upon which the bowl will be mounted, will provide the necessary planar surface to accommodate the removed food without soiling the floor.

The tray is of a size to accommodate, preferably, one, two or three mounted containers. In order to equalize and maximize the area of the tray about the mounted containers, the retainer recesses provided along the rear wall of the tray are so positioned as to mount a single feeding container at the center thereof. When two or three containers are to be mounted, the recesses, in each instance, will provide for an equal spacing of the containers, or a close approximation thereto. This will not only provide maximum space about each of the mounted containers, but will also provide an attractive arrangement, minimized crowding between the containers for easy access thereto, particularly in situations where more than one pet may be feeding at the same time. Also a balanced arrangement is provided whereby the tray and mounted food containers can be lifted and handled as a unit for, as an example, removing all of the feeding items from the floor simultaneously for filling and/or cleaning purposes. Appropriately positioned handle portions on the tray, in conjunction with the locking of the feeding containers to the tray, will also facilitate a carrying of the entire station as when traveling, attending pet exhibitions, and the like.

Additional features, objects and advantages of the invention will become apparent as the details of construction and manner of use are more fully hereinafter set forth.

BRIEF DESCRIPTION OF THE DRAWINGS

FIG. 1 is a perspective view of the pet feeding station of the invention with three bowl containers mounted thereon;

FIG. 2 is a rear perspective view of the feeding station with selected ones of the feeding containers in various relationships to the tray;

FIG. 3 is a top plan view of the feeding station with two equally spaced feeding containers;

FIG. 4 is an enlarged transverse cross-sectional view taken substantially on a plane passing alone line 4—4 in FIG. 3 with a partially illustrated seal engaged with the feeding bowl;

FIG. 5 is a partial left side elevational view of FIG. 3 with portions broken away for purposes of illustration;

FIG. 6 is an exploded perspective view illustrating the mounting arrangement for releasably securing a feeding container to the tray;

FIG. 7 illustrates the fully engaged retainer assembly.

DESCRIPTION OF PREFERRED EMBODIMENTS

Referring now more specifically to the drawings, the pet feeding station 10 comprises a feeding tray 12 releasably mounting at least one, and preferably two or three, feeding containers 14. While the feeding containers 14 have principally been illustrated as feeding bowls, preferably with removable seals 16, other forms of feeders, as illustrated in phantom lines in FIG. 2, are also contemplated for use in conjunction with the tray in accord with the specific requirements of the feeding station.

The feeding tray 12 includes, in its normal use position on the floor, a horizontal, planar tray panel 18 with a smooth easily cleaned upper surface 20. Peripheral walls, including a rear wall 22, front wall 24 and opposed side walls 26 are integrally formed with the corresponding edges of the tray panel 18 and extend continuously about the periphery of the tray panel.

As will be appreciated from the drawings, the rear wall 22 is preferably straight or linear, the front wall 24 is slightly forwardly convex, and the opposed side walls 26 are substantially parallel and integral with the opposed end portions of the front wall 24 through arcuate corner portions.

As will be noted from the cross-sectional details, each of the tray walls includes an upwardly extending inner flange 28 integral with the corresponding edge of the tray panel 18, and an outer flange 30 integral with the upper edge of the corresponding inner flange 28 and depending therefrom to a plane in spaced relation below the tray panel 18. The inner and outer flanges 28 and 30 extend continuously about the tray, forming a smooth continuous inner face and a substantially continuous outer face, with the integral joinder area between the upper edges thereof providing a rounded, smooth edge portion. The outer flanges 30, toward the lower edges thereof, slightly widened as at 32 to provide a stable supporting base for the pet feeding station.

The rear wall 22 along which the feeding containers 14 are to mount, is higher than the front wall 24, with the lower front wall facilitating access to the feeding containers by the pet. The opposed side walls 26, from the front wall 24 to generally the forward portion of the mounted feeding container or containers 14, are of a substantially constant height with the front wall 24, and then are of a gradually increasing height rearwardly toward the rear wall 22. The side walls 26, forwardly from the rear wall 22 for a minor distance, are of substantially equal height with the rear wall.

In order to facilitate a handling of the pet feeding station as a unit, for example in lifting the station to a countertop for cleaning and/or filling, the side walls 26 are provided with integrally formed handle portions 34 defined by elongate downwardly opening notches 36 in the outer flange 30 of each side wall. The handle notches extend upward to approximately mid height in each outer flange. In this manner, the tray can easily be grasped by the hands, and more particularly the fingers, for a secure engagement with and lifting of the tray and containers thereon. As will be noted in the drawings, the front-to-rear positioning of each of the handle portions 34 on the side walls 26 correspond generally to the positioning of the mounted containers, and hence the major weight of the pet station or the general center of gravity thereof, to minimize any tendency for the station to tip or slip as it is handled as a unit.

As noted, the pet feeding containers 14 mount on the rear wall 22, and releasably lock thereto, in predetermined orders or arrangements depending upon the number of containers utilized in order to provide maximum surrounding tray area. The tray 12, as illustrated, is intended to accommodate three arrangements of containers 14, a single centrally located container, two equally spaced containers and three equally spaced containers.

The positioning of the containers 14 is determined by two series of retainer components comprising recesses 38 and 40. Each of the recesses 38,40 is defined by inwardly offsetting the rear flange 30 of the rear wall 22 for the full height of the rear wall 22. Each recess 38,40 includes a planar inner wall 42 and two opposed side walls 44 which converge slightly toward each other downward from the upper end of the corresponding recess.

The retainer recesses 38 are provided in a series of three, including a central recess corresponding with the center of rear wall 22 and adapted to centrally positioned either a single container 14 or the central container of a series of three substantially equally spaced containers. The two endmost ones of the recesses 38 are, accordingly, located at substantially equally spaced positions to each side of the central recess.

The retainer recesses 40 comprises two recesses, one immediately inward of and closely adjacent to each of the outer recesses 38 for the accommodation, as suggested in FIG. 3, of two feeding containers 14 located to provide maximum droppage-accommodating tray area, the space between the two containers being slightly greater than the space between each container and the corresponding side wall 26. It is specifically intended that the containers be mounted in accord with the above described arrangements to provide maximum utility of the tray area about each of the containers. It will also be appreciated that by conforming to the above arrangements, the tray will be balanced, both by weight for easy handling, and by appearance.

While the station tray is formed to rest on the lower peripheral edge of the substantially continuous outer wall flange 30, supplemental, preferably non-skid, feet (not illustrated) can be mounted within depending split-ring sockets 46 integrally formed with the under or lower surface of the tray panel 18 at appropriate spacing generally following the rear and front tray walls 22 and 24.

The container 14 specifically illustrated and detailed in the drawings is a pet feeding bowl also designated by reference numeral 14. The bowl, preferably integrally formed as a single molded structure, includes an inner shell 50 of a softly rounded, generally semi-spherical configuration with a slightly flattened bottom and a substantially vertical smooth upper end portion to define the actual receptacle for food or water. The bowl 14 also includes an outer shell 52 surrounding the inner shell 50 and integral therewith along a flattened circular upper edge 54. The outer shell 52, about the inner shell 50, extends downwardly and outwardly, generally in the configuration of a truncated cone, to provide a lower tray-engaging support edge 56 below the bottom of the inner receptacle shell 50. At selected points about the inner surface of the outer shell 52, a series of small stacking lugs 58 are provided.

The feeding container or bowl 14 includes a combination handle and retainer 60 integrally formed with the outer bowl shell 52 and extending radially outward therefrom. This component 60 includes a pair of laterally spaced side panels 62 integral along one edge thereof and extending outward from the outer shell 52. The two side panels 62 are interconnected by an arcuate panel 64 integrally joining the upper edge portions of the side panels 62 and similarly integrally formed with the outer shell 52 to form an inverted generally u-shaped configuration. The panels 62 extend upward from a point at or slightly above the lower edge 56 of the outer shell 52 of the bowl with the uppermost point of the arcuate connecting panel 64 being in spaced relation below the upper edge 54 of the bowl. A planar outer panel 66 is joined or preferably integrally formed with the outer edges of the side panels 62 and arcuate panel 64 peripherally therealong.

The opposed side panels 62 of the retainer 60 each have a vertically elongate notch or slot 68 therein extending upwardly from the lower edge of the corresponding side panel 62. The opposed upwardly directed edges and the inner end of each notch 68 are formed to closely conform to the cross-section of the rear tray wall at each of the retainer recesses 38,40 defined in the rear tray wall 22. As such, the opposed sides of each notch 68 will be slightly inwardly converging upward from the lower edge. The lateral spacing between the notched side panels 62 is such whereby both are received within a single one of the retainer recesses 38,40 and in engaged sliding contact with the opposed sides 44 of the corresponding recess.

The height of the notches 68 such as to fully seat on a recessed portion of the tray rear wall simultaneously with a full flat seating of the corresponding bowl lower edge 56 on the upper surface 20 of the tray. The width of the notches 68 is such as to intimately engage the inner flange 28 of the rear wall of the tray, and the inner wall 42 of the corresponding recess 38,40. In fact, the size relationship may be such as to effect a slight compressing of the rear tray wall 22 upon a full mounting of the retainer 60.

With the bowl 14 mounted to the tray by the retainer 60 engaged within the corresponding recess, it will be recognized that the bowl is effectively locked to the tray against displacement by any force to which it might be subjected by a feeding pet. In other words, the bowl cannot slide relative to the tray in any direction. Nevertheless, the bowl can be easily removed from the tray, without handling the receptacle portion of the bowl, by merely engaging ones fingers below the rear panel 66 and lifting upward. The retainer 60 also conveniently functions as a handle for handling the bowl away from the tray, thus avoiding contact with the interior of the bowl and the contents thereof.

The lower edge of the retainer is in a common plane with the lower edge of the outer bowl shell 52, or slightly thereabove, so as to not interfere with the positioning of the bowl on a horizontal surface, such as a countertop or the like. This positioning of the retainer 60, noting FIGS. 4 and 5, provides for a slight space below the retainer, and particularly the back panel 66 thereof, when the container is mounted on a tray. This facilitates engagement of the fingers below the back panel 66 for a disengaging of the bowl from the tray rear wall.

It is also contemplated that the feeding bowls 14 be provided with a seal 16 which engages thereover and seals thereto. The seal 16 includes a depressed central portion 70 with an annular peripheral edge portion 72 which frictionally engages within and peripherally about the upper edge portion of the inner bowl shell 50. The seal 16 also includes an annular outwardly directed flange 74 which overlies the top outer edge 54 of the bowl, and an outer gripping bead 76 extending slightly beyond the upper edge portion of the outer shell 52. The seal 16 thus acts generally in the manner of a plug for the outer end of the bowl, enabling an individual packing of several bowls to provide pre-prepared food which can be stored in the refrigerator or freezer, carried on trips, and the like. The seal 16 does not require any disruption in the desired smooth interior and exterior of the bowl for feeding and cleaning purposes.

As previously suggested, the bowls, particularly with the seals thereon, are stackable, the stacking lugs 58 being so positioned as to engage on the seal of a subjacent closed bowl for a nesting and stabilization of the stack.

While the pet station 10 has been described as comprising the tray 12 in combination with bowl-type containers 14, other forms of containers, for example, automated feeders as suggested in the phantom line showing in FIG. 2, can also be mounted to the tray. In each instance, the container will incorporate an appropriate retainer 60 as above described.

From the foregoing, it will be appreciated that the uniqueness of the invention resides in both the combination of the individual units to define a pet feeding station, and the units themselves wherein the construction thereof specifically adapts them for use in the combination which forms the complete station.

The foregoing is considered illustrative of the invention. However, it is to be appreciated that as variations may readily occur to those skilled in the art, the invention is not to be limited to the specific embodiments illustrated. Rather, the invention is only to be limited by the scope of the claims following hereinafter.

We claim:

1. A pet feeding station comprising a feeding tray and at least one feeding container, said tray including a substantially horizontal tray surface, an elongate rear wall of predetermined height extending along and upwardly projecting from said surface, said rear wall having a smooth continuous inner face, said rear wall having a plurality of duplicate retainer components for alternately and individually releasably retaining said at least one feeding container in overlying relation to said tray surface with said tray surface extending beyond said at least one container about a major portion of said at least one container forward of said rear wall for reception of spillage from said at least one container, each retainer component comprising a rearwardly directed and upwardly opening recess defined in said rear wall and extending along the height thereof, said at least one feeding container including a surrounding wall, a retainer rigid with said container wall and extending outwardly relative thereto, said retainer, outward of said container, being adapted to overlie said tray rear wall and engage downwardly into a selected one of the retainer recesses whereby lateral shifting of said at least one container relative to said tray is precluded.

2. The pet feeding station of claim 1 wherein said retainer components are arranged in at least two readily distinguishable arrangements, each of a plurality of said retainer components.

3. The pet feeding station of claim 1 wherein said rear wall comprises inner and outer coextensive flanges joined along a common upper edge, said inner flange facing toward said tray and defining a smooth continuous face, said outer flange being inwardly offset at selected areas along the length thereof and defining said retainer component recesses.

4. A pet feeding station comprising a feeding tray and at least one feeding container, said tray including a substantially horizontal tray surface, an elongate rear wall extending along and upwardly projecting from said surface, said rear wall having a plurality of retainer components for selectively and individually receiving and releasably retaining said at least one feeding container in overlying relation to said tray surface with said tray surface extending beyond said at least one container about a major portion of said at least one container forward of said rear wall for reception of spillage from said at least one container, said retainer components being arranged in at least two readily distinguishable arrangements, each arrangement being of a plurality of said retainer components, one of said arrangements comprising three retainer components, a center component centrally positioned along said rear wall and two end components, each end component being equally spaced to opposed sides of said center component along said rear wall.

5. The pet feeding station of claim 4 wherein a second of said arrangements comprises two retainer components each inwardly spaced along said rear wall relative to a respective one of said first arrangement end components.

6. The pet feeding station of claim 5 wherein each retainer component comprises a recess defined in said rear wall and extending along the height thereof.

7. The pet feeding station of claim 6 wherein said rear wall comprises inner and outer coextensive flanges joined along a common upper edge, said inner flange facing toward said tray and defining a smooth continuous face, said outer flange being inwardly offset at selected areas along the length thereof and defining said retainer component recesses.

8. The pet feeding station of claim 7 wherein said tray includes side walls extending forwardly from said rear wall, said side walls, for a predetermined distance forward of said rear wall, being of generally equal height therewith and similarly defined by inner and outer flanges, said outer flange of each side wall having an upwardly extending recess defined therein and forming a handle, said inner flange of each side wall presenting a smooth uninterrupted inner face directed towards said tray surface.

9. The pet feeding station of claim 7 wherein said at least one feeding container comprises an inner receptacle and an outer surrounding wall with substantially coextensive upper edges, a retainer rigid with said outer wall and extending outwardly relative thereto for selective engagement with one of said retainer recesses, said retainer and retainer recess, when engaged, precluding lateral shifting of said at least one container relative to said tray.

10. The pet feeding station of claim 9 wherein said retainer comprises laterally spaced side panels extending from said outer surrounding wall, a pair of laterally aligned notches in said side panels extending vertically upward therein for downward engagement over said tray rear wall at a corresponding recess, and a rear panel spanning and fixed to said side panels outward of said side panel notches.

11. The pet feeding station of claim 10 wherein said receptacle defines an upwardly opening generally spherical food-receiving interior inward of said surrounding wall, said surrounding wall tapering downwardly and outwardly from its upper edge and terminating in a lower support edge, said retainer extending between said support edge and a point downwardly spaced from said upper edge of said surrounding wall.

12. The pet feeding station of claim 11 including a receptacle seal overlying said upper edge of said surrounding wall and frictionally engaging said interior, said seal extending radially outward of said surrounding wall upper edge peripherally thereabout.

13. A pet feeding station comprising a feeding tray and at least one feeding container, said tray including a substantially horizontal tray surface, an elongate rear wall extending along and upwardly projecting from said surface, said rear wall having a plurality of retainer components for selectively and individually receiving and releasably retaining said at least one feeding container in overlying relation to said tray surface with said tray surface extending beyond said at least one container about a major portion of said at least one container forward of said rear wall for reception of spillage from said at least one container, said retainer components being arranged in at least two readily distinguishable arrangements, each arrangement being of a plurality of said retainer components, said at least one feeding container comprising an inner receptacle and an outer surrounding wall with substantially coextensive upper edges, a retainer rigid with said outer wall and extending outwardly relative thereto for selective engagement with one of said retainer components, said retainer and retainer component, when engaged, precluding lateral shifting of said at least one container relative to said tray.

14. A pet feeding station comprising a feeding tray and at least one feeding container, said tray including a substantially horizontal tray surface, an elongate rear wall extending along and upwardly projecting from said surface, said rear wall having a plurality of retainer components for selectively and individually receiving and releasably retaining said at least one feeding container in overlying relation to said tray surface with said tray surface extending beyond said at least one container about a major portion of said at least one container forward of said rear wall for reception of spillage from said at least one container, each retainer component comprising a recess defined in said rear wall and extending along the height thereof, said rear wall comprising inner and outer coextensive flanges joined along a common upper edge, said inner flange facing toward said tray and defining a smooth continuous face, said outer flange being inwardly offset at selected areas along the length thereof and defining said retainer component recesses, said at least one feeding container comprising an inner receptacle and an outer surrounding wall with substantially coextensive upper edges, a retainer rigid with said outer wall and extending outwardly relative thereto for selective engagement with one of said retainer recesses, said retainer and retainer recess, when engaged, precluding lateral shifting of said at least one container relative to said tray.

15. The pet feeding station of claim 14 wherein said retainer comprises laterally spaced side panels extending from said outer surrounding wall, a pair of laterally aligned notches in said side panels extending vertically upward therein for downward engagement over said tray rear wall at a corresponding recess, and a rear panel spanning and fixed to said side panels outward of said side panel notches.

16. A pet feeding station comprising a feeding tray and at least one feeding container, said tray including a substantially horizontal tray surface, an elongate wall extending along and upwardly projecting from said surface, said wall having an elongate upper edge, retainer means for releasably retaining said at least one container to said wall and in overlying relation to said tray surface and restricting movement of said at least one container on said tray surface, said at least one container having a surrounding wall, said retainer means comprising a retainer rigid with said at least one container surrounding wall and projecting outward therefrom, said retainer comprising laterally spaced side panels extending from said at least one container surrounding wall, a pair of laterally aligned notches in said panels extending upward therein for downward engagement over said tray rear wall, and a rear panel spanning and fixed to said side panels outward of said notches.

17. The pet feeding station of claim 16 wherein said retainer means further comprises at least one recess defined in said rear wall and extending along the height thereof for reception of said retainer therein.

18. The pet feeding station of claim 17 wherein said tray wall comprises inner and outer coextensive flanges joined in a common upper edge, said inner flange facing toward said tray and defining a smooth continuous face, said outer flange being inwardly offset at at least one selected area along the length thereof and defining said at least one retainer recess.

* * * * *